United States Patent
Nair et al.

(10) Patent No.: US 9,665,899 B1
(45) Date of Patent: May 30, 2017

(54) DYNAMICALLY OPTMIZING INVENTORY PICKING PATH WITHIN A STORE

(71) Applicant: International Business Machines Corporation, Armonk, NY (US)

(72) Inventors: Mukesh M. Nair, Chelmsford, MA (US); Peter E. Stubbs, Georgetown, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/088,041

(22) Filed: Mar. 31, 2016

(51) Int. Cl.
*G06Q 10/00* (2012.01)
*G06Q 30/06* (2012.01)

(52) U.S. Cl.
CPC .................... *G06Q 30/0617* (2013.01)

(58) Field of Classification Search
CPC .................... G06Q 10/087; G06Q 10/0875
USPC .................................... 705/28, 29
See application file for complete search history.

(56) References Cited

U.S. PATENT DOCUMENTS

| | | | | |
|---|---|---|---|---|
| 6,376,633 B1 * | 4/2002 | Yamamoto | ............ | C08F 220/18 526/236 |
| 6,904,421 B2 * | 6/2005 | Shetty | .................. | G06Q 10/047 706/13 |
| 7,013,289 B2 * | 3/2006 | Horn | ..................... | G06Q 10/087 705/14.51 |
| 7,222,786 B2 * | 5/2007 | Renz | ...................... | G06Q 10/06 235/385 |

(Continued)

FOREIGN PATENT DOCUMENTS

| | | |
|---|---|---|
| EP | 1211623 A2 | 6/2002 |
| WO | 2010141656 A1 | 12/2010 |
| WO | 2013003187 A1 | 1/2013 |

OTHER PUBLICATIONS

Dematic, "Voice Directed Case Pick-to-Pallet," downloaded on Jan. 28, 2016 from http://www.dematic.com/en/Supply-Chain-Solutions/By-Vertical-Market/Typical-Solutions/Voice-Directed-Pick-to-Pallet, pp. 1-6, Dematic Worldwide website, Georgia.

(Continued)

*Primary Examiner* — Andrew Joseph Rudy
(74) *Attorney, Agent, or Firm* — Sherman IP LLP; Kenneth L. Sherman; Hemavathy Perumal (57) ABSTRACT

One embodiment provides a system for dynamically optimizing inventory picking paths within a physical store. The system performs operations including receiving merchandise requests from customers, providing the merchandise requests to merchandise pickers, and receiving, from the merchandise pickers, picking data identifying picking paths executed by the merchandise pickers when picking items within the physical store to fulfill the merchandise requests. The operations further include analyzing the merchandise requests and the picking data to identify an algorithm suitable for determining an optimized picking path, and, in response to receiving a new merchandise request, applying the algorithm to determine an optimized picking path for fulfilling the new merchandise request. The optimized picking path is provided to at least one of the merchandise pickers. The algorithm is dynamically adjustable in response to receiving additional picking data identifying different picking paths that reflect changes to the store layout.

1 Claim, 5 Drawing Sheets

(56) References Cited

U.S. PATENT DOCUMENTS

| | | | | |
|---|---|---|---|---|
| 7,243,001 B2* | 7/2007 | Janert | ............... | G06Q 10/08 |
| | | | | 700/213 |
| 7,496,852 B2* | 2/2009 | Eichorn | ........... | G06F 17/30572 |
| | | | | 707/999.101 |
| 7,644,863 B2* | 1/2010 | Chen | ................ | G06Q 10/06 |
| | | | | 235/385 |
| 8,244,603 B1* | 8/2012 | Tang | ............. | G06Q 10/0633 |
| | | | | 414/222.07 |
| 8,412,656 B1* | 4/2013 | Baboo | ............ | G06Q 30/0201 |
| | | | | 706/20 |
| 8,549,407 B2* | 10/2013 | O'Neil Garcia | .. | G06F 17/30873 |
| | | | | 715/733 |
| 8,695,872 B2* | 4/2014 | Braunstein | .......... | G06Q 10/087 |
| | | | | 235/379 |
| 9,098,905 B2* | 8/2015 | Rivlin | ................ | G06T 7/004 |
| 9,120,622 B1* | 9/2015 | Elazary | .............. | B65G 1/1373 |
| 9,524,485 B1* | 12/2016 | Shakes | ............. | G06Q 10/087 |
| 2003/0167213 A1 | 9/2003 | Jammes et al. | | |
| 2005/0278062 A1 | 12/2005 | Janert et al. | | |
| 2012/0239504 A1 | 9/2012 | Curlander et al. | | |
| 2013/0283211 A1* | 10/2013 | Malkin | ............... | G06Q 10/06 |
| | | | | 715/844 |
| 2013/0332273 A1 | 12/2013 | Gu et al. | | |
| 2014/0156461 A1 | 6/2014 | Lerner | | |
| 2015/0100433 A1 | 4/2015 | Choy et al. | | |
| 2015/0294395 A1 | 10/2015 | Deshpande et al. | | |
| 2016/0042315 A1 | 2/2016 | Field-Darragh et al. | | |

OTHER PUBLICATIONS

RFID Centre, "Item Locator System", downloaded on Jan. 28, 2016 from http://www.rfidc.com/docs/warehouse_item_locator.htm, p. 1, United Kingdom.

* cited by examiner

DYNAMICALLY OPTMIZING INVENTORY PICKING PATH WITHIN A STORE

The present invention generally relates to merchandise location systems, and more particularly, a system for dynamically optimizing an inventory picking path within a physical store.

BACKGROUND

For one or more items retailed/sold by a retail company, a customer may buy online and pickup in-store (BOPIS). Further, for one or more items bought by a customer online, a retail company may directly ship from stores (SFS) (e.g., physical stores and/or warehouses) to the customer to optimize shipping costs. Both BOPIS and SFS orders require one or more employees of a retail company (e.g., store employees or merchandise pickers) to "pick" one or more items ordered by a customer from one or more locations within a physical store of the retail company.

SUMMARY

One embodiment provides a system for dynamically optimizing inventory picking paths within a physical store. The system performs operations including receiving merchandise requests from customers, providing the merchandise requests to merchandise pickers, and receiving, from the merchandise pickers, picking data identifying picking paths executed by the merchandise pickers when picking up items within the physical store to fulfill the merchandise requests. The operations further include analyzing the merchandise requests and the picking data to identify an algorithm suitable for determining an optimized picking path, and, in response to receiving a new merchandise request, applying the algorithm to determine an optimized picking path for fulfilling the new merchandise request. The optimized picking path is provided to at least one of the merchandise pickers. The algorithm is dynamically adjustable in response to receiving additional picking data identifying different picking paths that reflect changes to the store layout.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to merchandise location systems, and more particularly, a system for dynamically optimizing an inventory picking path within a physical store. One embodiment provides a system for dynamically optimizing inventory picking paths within a physical store. The system performs operations including receiving merchandise requests from customers, providing the merchandise requests to merchandise pickers, and receiving, from the merchandise pickers, picking data identifying picking paths executed by the merchandise pickers when picking up items within the physical store to fulfill the merchandise requests. The operations further include analyzing the merchandise requests and the picking data to identify an algorithm suitable for determining an optimized picking path, and, in response to receiving a new merchandise request, applying the algorithm to determine an optimized picking path for fulfilling the new merchandise request. The optimized picking path is provided to at least one of the merchandise pickers. The algorithm is dynamically adjustable in response to receiving additional picking data identifying different picking paths that reflect changes to the store layout.

For expository purposes, the term "item" as used herein generally denotes a product or merchandise available for purchase from a retail store. The terms "item", "merchandise", and "product" may be used interchangeably in this specification.

For expository purposes, the term "physical store" as used herein generally denotes a physical space owned and/or operated by a retail company. A physical store maintains/houses one or more items retailed/sold by a retail company. Examples of physical stores include, but are not limited to, mercantile establishments, outlets, warehouses, department stores, shopping centers, strip malls, etc.

For expository purposes, the term "merchandise request" as used herein generally denotes a BOPIS/SFS order.

For expository purposes, the term "merchandise picker" as used herein generally denotes an employee of a retail company (e.g., a store employee) tasked with picking one or more items from one or more locations within a physical store of the retail company to fulfill a merchandise request.

For expository purposes, the term "store layout" as used herein generally denotes an layout of a physical store.

For expository purposes, the term "picking path" as used herein generally denotes a sequence/order in which items within a physical store are picked by a merchandise picker to fulfill a merchandise request. In this specification, the terms "picking path" and "picking order" may be used interchangeably.

If a store layout of a physical store is modeled electronically, a merchandise picker may be directed, via an application running on an electronic device, to pick items in accordance with a picking path that reduces amount of time expended in picking the items. Picking items in accordance with optimized picking paths provide higher efficiency when picking items for multiple orders in batches. Retail companies, however, often change store layouts of its physical stores due to displays, seasonal items, product promotions, high product turnover, market research, etc. As some retail companies may not model store layouts of its physical stores electronically, conventional applications used to determine picking paths may not identify optimized picking paths.

Conventional applications used to determine picking paths rely on either global positioning systems (GPSs) or pre-defined information identifying item locations within a physical store (e.g., a layout of a physical store is modeled electronically). GPSs, however, may be expensive and are not always pin-point accurate. Further, utilizing pre-defined information may not be suitable for retail companies that often change store layouts of its physical stores.

One embodiment of the invention provides an application for dynamically learning an optimized picking path within a physical store based on actions of merchandise pickers when a store layout of the physical store is unknown to the application. The application is configured to determine an optimized picking path based on historical data comprising previously executed picking paths. The invention allows a retail company to change a store layout and item locations as often as possible while still providing optimized picking paths without additional cost for additional resources (e.g., hardware).

Figure 1:
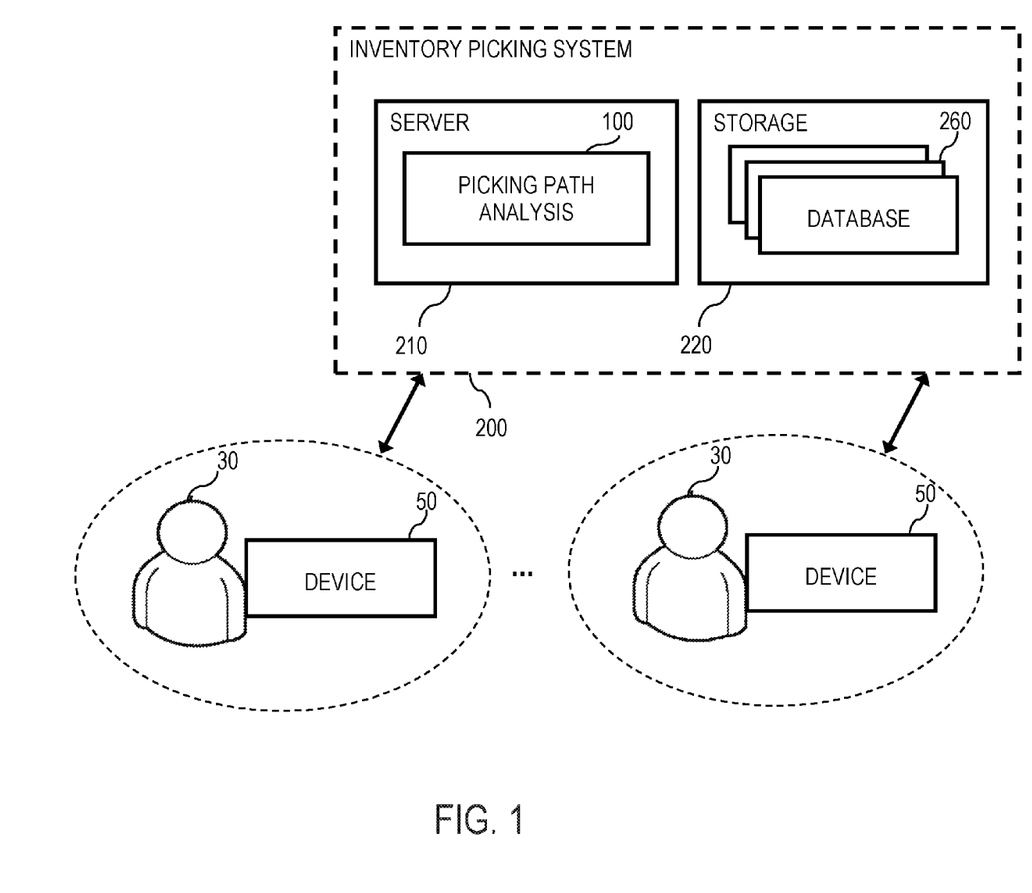
FIG. 1 illustrates an example inventory picking system, in accordance with an embodiment of the invention.

FIG. 1 illustrates an example inventory picking system 200, in accordance with an embodiment of the invention. The system 200 comprises one or more server devices 210, and one or more storage devices 220. The storage devices 220 maintain one or more databases 260. As described in detail later herein, one or more application units may execute/operate on the server devices 210, such as a picking path analysis unit 100 configured for dynamically learning an optimized picking path within a physical store based on actions of merchandise pickers when a store layout of the physical store is unknown.

A merchandise picker 30 may exchange data with the system 200 via a mobile electronic device 50, such as a laptop computer, a tablet, a mobile smartphone, a wearable device (e.g., a smartwatch), etc. In one embodiment, each device 50 exchanges data with the system 200 over a connection (e.g., a wireless connection, a wired connection, or a combination of the two).

As described in detail later herein, a device 50 is configured to forward to the system 200 actions of a merchandise picker 30 carrying the device 50.

Figure 2A:
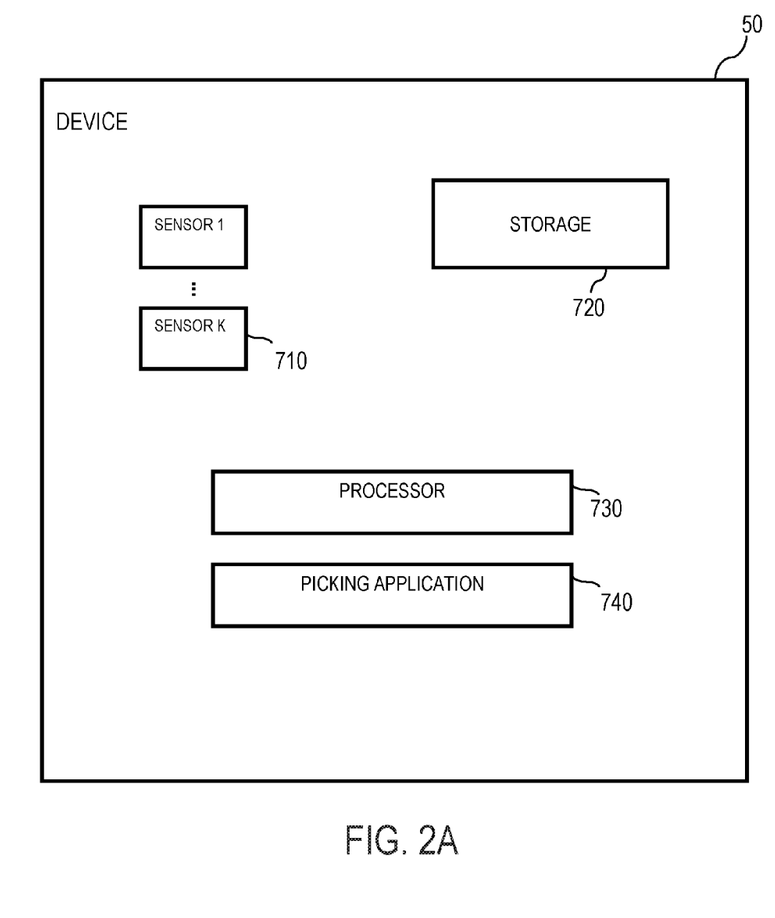
FIG. 2A illustrates an example device, in accordance with an embodiment of the invention.

FIG. 2A illustrates an example device 50, in accordance with an embodiment of the invention. The device 50 comprises a storage unit 720, a processor 730, one or more sensor units 710, and a mobile picking application 740.

The mobile picking application 740 is configured to: (1) receive a picking path from the system 200, and (2) present, on a display of the device 50, the picking path. In one embodiment, the picking path is presented as a list of items arranged in an order/sequence for the merchandise picker 30 to follow to fulfill a merchandise request. The picking path results in the shortest and most efficient walking path for the merchandise picker 30 when picking all items fulfilling the merchandise request.

The sensor units 710 are configured to record/capture actions of the merchandise picker 30 carrying the device 50 when picking items to fulfill a merchandise request. The actions recorded/captured include an executed picking path identifying an exact sequence/order in which the items were picked by the merchandise picker 30.

In one embodiment, the sensors unit 710 comprise scanning software configured to scan items picked by the merchandise picker 30. When the merchandise picker 30 picks and scans an item, the scanning software records/captures a time at which the item is picked and an identifier of the item.

The mobile picking application 740 is further configured to forward actions recorded/captured by the sensor units 710 to the system 200.

Figure 2B:
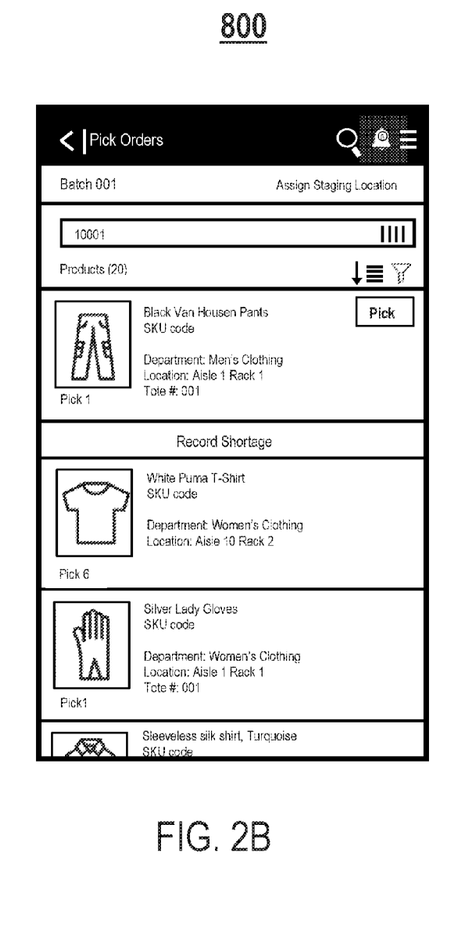
FIG. 2B illustrates an example presentation for display on a device, wherein the presentation identifies an optimized picking path, in accordance with an embodiment of the invention.

FIG. 2B illustrates an example presentation 800 for display on a device 50, wherein the presentation 800 identifies an optimized picking path, in accordance with an embodiment of the invention. As shown in FIG. 2B, the optimized picking path is presented as a list of items arranged in an order/sequence that results in the shortest and most efficient walking path for a merchandise picker 30 when picking all items fulfilling a merchandise request. The order/sequence in which the merchandise picker 30 picks items is in accordance with the list. The merchandise picker 30 scans each item as it is picked.

Figure 3:
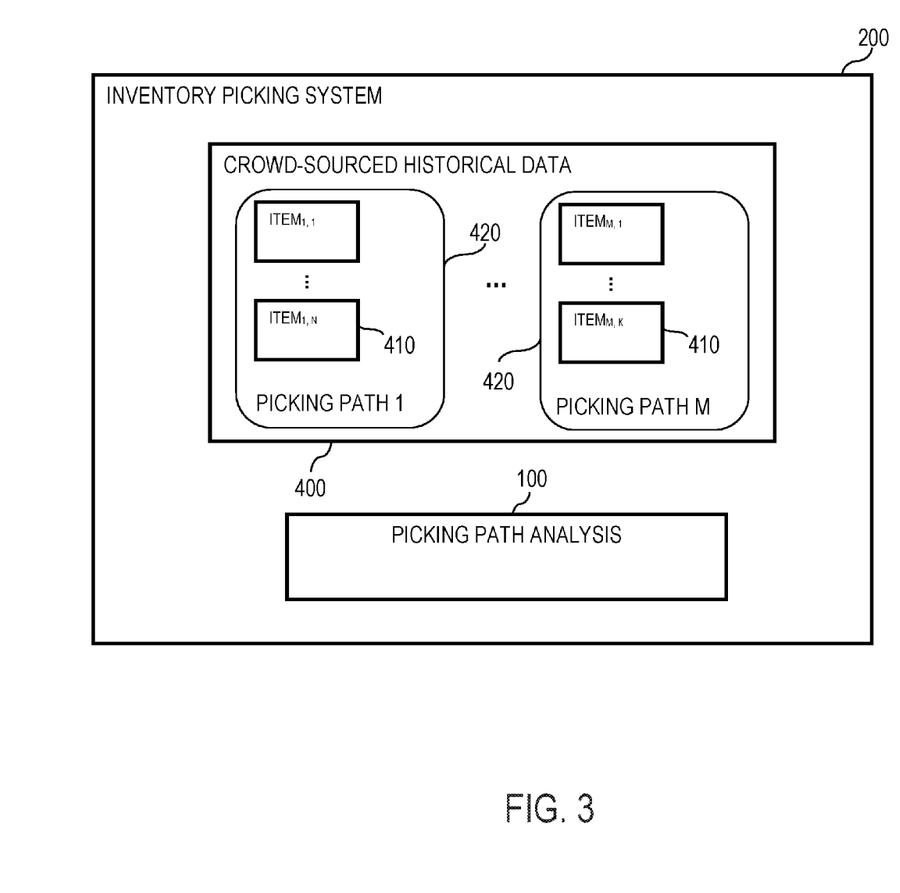
FIG. 3 illustrates the example inventory picking system in detail, in accordance with an embodiment of the invention.

FIG. 3 illustrates the example inventory picking system 200 in detail, in accordance with an embodiment of the invention. As stated above, the storage devices 220 may maintain one or more databases 260. For example, the storage devices 220 may include a database 400 comprising a repository of historical data crowd-sourced from multiple merchandise pickers 30, where the historical data includes previously executed picking paths.

In one embodiment, the database 400 comprises multiple data records 420, wherein each data record 420 corresponds to a previously executed picking path captured by a device 50 carried by a merchandise picker 30 (e.g., a first data record 420 corresponding to PICKING PATH 1, . . . , an $M^{th}$ data record 420 corresponding to PICKING PATH M). Each data record 420 identifies an order/sequence in which one or more items 410 were picked by a merchandise picker 30 to fulfill a merchandise request.

Initially, the system 200 does not know a correct order/sequence in which items should be picked to ensure the shortest and most efficient walking path that a merchandise picker 30 should follow to fulfill a merchandise request. Each time a merchandise picker 30 fulfills a merchandise request, the system 200 receives from a device 50 carried by the merchandise picker 30 a picking path executed by the merchandise picker 30 in fulfilling the merchandise request. Further, a merchandise picker 30 may manually improve a picking path with each merchandise request fulfilled. Previously executed picking paths received by the system 200 are maintained in the database 400.

The picking path analysis unit 100 is configured to: (1) receive one or more merchandise requests, (2) forward the merchandise requests to one or more devices 50 carried by one or more merchandise pickers 30, (3) receive, from the devices 50, picking data identifying one or more previously executed picking paths performed by the merchandise pickers 30 in fulfilling the merchandise requests, (4) aggregate the picking data, (5) analyze the picking data and the merchandise requests to identify an algorithm suitable for determining an optimized picking path, (6) in response to receiving a new merchandise request, apply the algorithm to identify an optimized picking path for the new merchandise request, and (7) provide the optimized picking path to at least one of the merchandise pickers 30.

In one embodiment, the picking path analysis unit 100 performs aggregation of the picking data as a background process.

In one embodiment, the algorithm identified is based on locations of the items within the physical store, efficiency of the merchandise pickers 30, and/or familiarity of the merchandise pickers 30 with a store layout of the physical store.

In one embodiment, the algorithm is adjusted based on at least one of the following: changes in inventory stocking at the physical store, changes in weightings assigned, aggregated store arrangements, department specific assessments/rankings, product specific assessments/rankings, etc.

In one example scenario, assume a first merchandise picker 30 is tasked with picking a first set of items within a physical store to fulfill first merchandise request. For example, the first set of items may include, but are not limited to, the following items: Nike Shoes Size 11, DVD Player, AAA batteries, Nike Exercise Shorts, Kitchen Aid Mixer, Adidas Men's Socks, Levi's Men's 505 Jeans, and Levi's Men's Belt. Initially, the system 200 does not know an order/sequence in which the first set of items should be picked as the first merchandise picker 30 is the first merchandise picker to perform a picking process. Therefore, the first merchandise picker 30 picks the first set of items without any guidance from the system 200 as to a picking path to follow when picking the first set of items.

If the first merchandise picker 30 is an experienced merchandise picker who is knowledgeable about a store layout of the physical store, the first merchandise picker 30 improvises a picking path that may be construed as efficient. For example, assume the improvised picking path executed by the first merchandise picker 30 comprises the following order/sequence in which the first set of items are picked: (1) Levi's Men's 505 Jeans, (2) Levi's Men's Belt, (3) Nike Exercise Shorts, (4) Adidas Men's Socks, (5) Nike Shoes Size 11, (6) Kitchen Aid Mixer, (7) DVD Player, and (8) AAA batteries. The improvised picking path is captured by sensor units 710 of a device 50 carried by the first merchandise picker 30. A mobile picking application 740 of the device 50 forwards the improvised picking path to the system 200 as picking data; the improvised picking path is an example previously executed picking path.

Assume a second merchandise picker 30 is tasked with picking a second set of items within the physical store to fulfill a different merchandise request. The second set of items may include items that overlap with the first set of items. For example, the second set of items may include, but are not limited to, the following items: Levi's Men's Belt, Nike Exercise Shorts, Nike Shoes Size 11, Reebok Shoes Size 9, DVD Player, Universal Remote Control, and Timex Men's Watch. Based on previously executed picking paths (e.g., the improvised picking path performed by the first merchandise picker 30), the picking path analysis unit 100 may provide, to a device 50 carried by the second merchandise picker 30, an efficient picking path to follow to fulfill the different merchandise request. A picking application 740 on the device 50 carried by the second merchandise picker 30 provides, on a display of the device 50, the efficient picking path.

For example, the efficient picking path may be represented as a list of items arranged in an order/sequence that provides the shortest and most efficient walking path for the second merchandise picker 30. As the system 200 does not yet know an efficient picking path for some items of the second set of items that have not been picked before (i.e., items of the second set of items that do not overlap with the first set of items), the items that have not been picked before may be grouped with the items that have been picked before (i.e., items of the second set of items that overlap with the first set of items). For example, an item that has not been picked before may be grouped with an item with the same item category/department code that has been picked before; both items are likely to be located within close proximity of each other within the physical store.

If the store layout of the physical store changes to a new store layout, merchandise pickers 30 will become familiar with the new store layout over item and execute a new picking path that differs from an efficient picking path provided by the system 200. The system 200 is further configured to dynamically learn/recognize changes in an order/sequence in which items that have been picked before are now picked, and adjust an efficient picking path determined for the items based on the changes (i.e., learn the new picking path). By automatically adjusting an efficient picking path based on recent picking data, changes to the store layout will eventually be reflected, and picking efficiency can be maintained without any effort from system administrators/store managers and without incurring additional costs.

The picking path analysis unit 100 applies logic to learn an efficient picking path. In one embodiment, the learning of an efficient picking path is a continuous process that may be performed as a background process, scheduled to run nightly, weekly, or at any other periodic interval, based on picking data received by the system 200 over time.

For expository purposes, let the term "batch run" generally denote one pass a merchandise picker 30 takes through a physical store to pick all items on a batch list. Sensor units 710 of a device carried by the merchandise picker 30 are configured to capture/record picking data including time and identifier (ID) of each item picked up during the batch run. The picking data captured/recorded is forwarded to the system 200 for analysis. The picking path analysis unit 100 analyzes times included in the picking data, and determines an order/sequence in which the items were picked during the batch run. The order/sequence determined is then compared against a current efficient picking path for the items. If there are differences, a new efficient picking path for the items may be generated by re-arranging some of the items in the current efficient picking path.

In one embodiment, the system 200 implements department specific ranking and product specific ranking. Specifically, the system 200 determines a most common picking path executed within a physical store based on picking data received, assigns each department within the physical store a corresponding unique sequence number based on the most common picking path, and assigns each product within each department a corresponding unique sequence number based on the most common picking path. Sequence numbers for departments are separate from sequence numbers for products to facilitate grouping of items that have never been picked before with items of the same department that have been picked before.

In one embodiment, the system 200 may classify a subset of merchandise pickers 30 as expert merchandise pickers; picking data capturing actions recorded by expert merchandise pickers will be assigned a higher weighting during the aggregation of historical data.

In one embodiment, the system 200 may incorporate one or more parameters/factors to adjust "stickiness" of a current efficient picking path based on frequency of changes to a store layout of a physical store. For example, a physical store with a store layout that does not change frequently may be assigned a higher "stickiness" factor than another physical store with a store layout that changes frequently. The lower the "stickiness" factor, the more easily a current efficient picking path may be updated to reflect changes to a store layout.

In one embodiment, in response to significant changes to a store layout of a physical store, the system 200 enables reset of an efficient picking path for the physical store (i.e., a wipe of a current efficient picking path for the physical store) to quicken learning of a new efficient picking path.

In one embodiment, if a new physical store has a similar layout to an older physical store that the system 200 already maintains historical data for, the system 200 may apply an efficient picking path for the older physical store to the new physical store.

Figure 4:
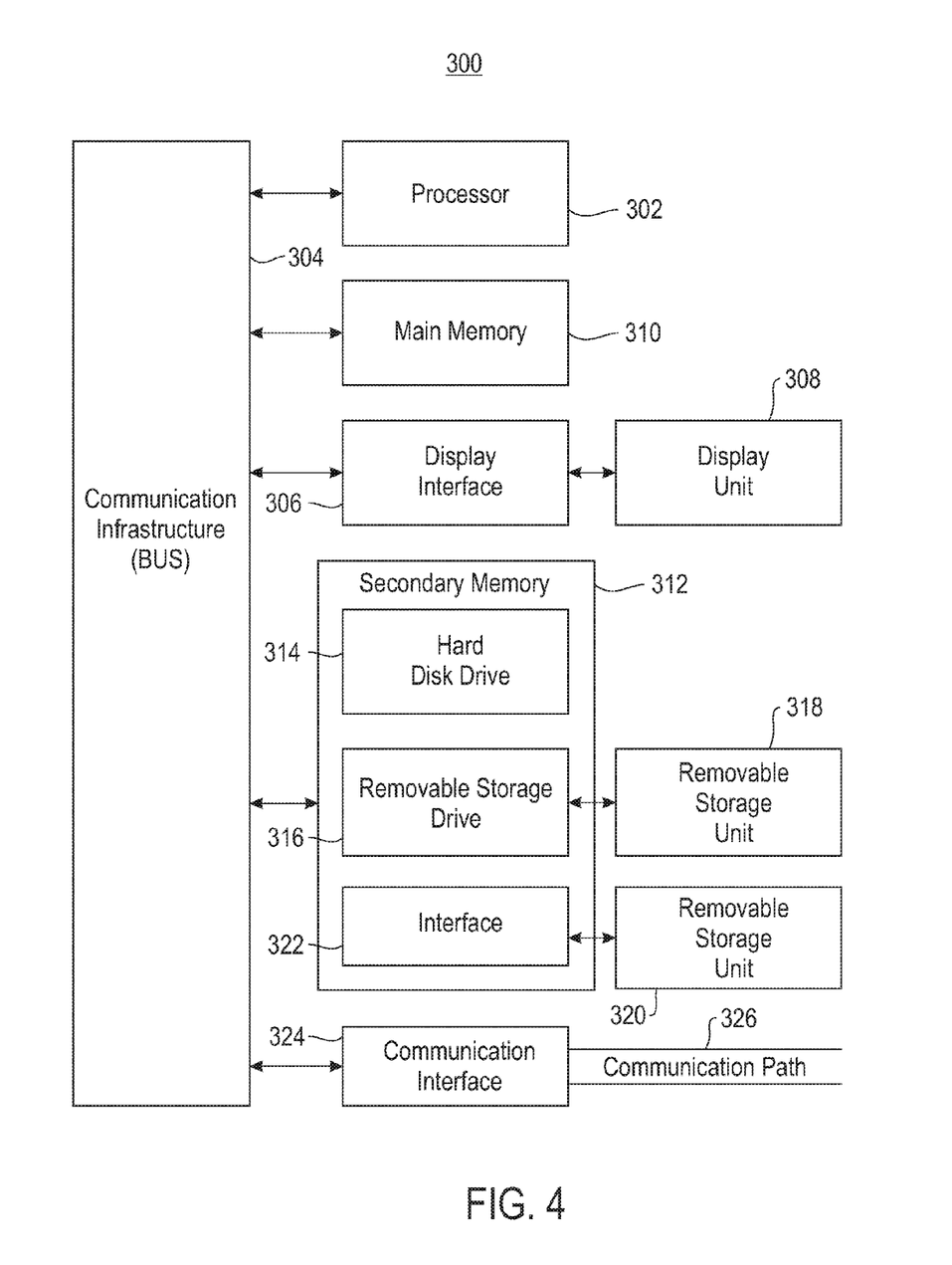
FIG. 4 is a high level block diagram showing an information processing system useful for implementing an embodiment of the present invention.

FIG. 4 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for dynamically optimizing inventory picking paths within a physical store, comprising:
   at least one processor; and
   a storage device storing instructions that when executed by the at least one processor causes the at least one processor to perform operations including:
      receiving a first merchandise requests, wherein the first merchandise request identifies a first set of items to pick within the physical store;
      providing the first merchandise request to a first electronic device for display, wherein the first electronic device is carried by a first merchandise picker;
      receiving, from the first electronic device, picking data captured by one or more sensors of the first electronic device, wherein the picking data comprises, for each item picked by the first merchandise picker, a corresponding time and a corresponding identifier of the item;
      determining a first picking path executed by the first merchandise picker based on the picking data, wherein the first picking path indicates a first order in which the first set of items were picked by the first merchandise picker to fulfill the first merchandise request;
      aggregating the picking data;
      analyzing the first merchandise request and the aggregated picking data to identify an algorithm suitable for determining an optimized picking path, wherein the algorithm is identified based on locations of the first set of items within the physical store, efficiency of the first merchandise picker, and familiarity of the first merchandise picker with a store layout of the physical store;

receiving a new merchandise request, wherein the new merchandise request identifies a second set of items to pick within the physical store, and at least one item of the second set of items overlaps with the first set of items;

applying the algorithm to determine an optimized picking path for fulfilling the new merchandise request;

providing the optimized picking path and the new merchandise request to a second electronic device for display, wherein the second electronic device is carried by a second merchandise picker;

receiving, from the second electronic device, additional picking data captured by one or more sensors of the second electronic device;

determining a second picking path executed by the second merchandise picker based on the additional picking data, wherein the second picking path indicates a second order in which the second set of items were picked by the second merchandise picker to fulfill the new merchandise request; and determining whether there are one or more changes to the store layout by determining whether the second picking path is different from the optimized picking path, wherein, in response to determining the second picking path is different from the optimized picking path, the optimized picking path is automatically updated to reflect the one or more changes to the store layout.

\* \* \* \* \*